United States Patent [19]

Kovalchuk et al.

[11] 3,894,850
[45] July 15, 1975

[54] SUPERHARD COMPOSITION MATERIAL BASED ON CUBIC BORON NITRIDE AND A METHOD FOR PREPARING SAME

[76] Inventors: Jury Matveevich Kovalchuk, 2 Selskokhozyaistvennaya ulitsa, 2, kv. 15, Moscow; Vladislav Sergeevich Lysanov, ulitsa Vavilovykh 15/3, kv. 73, Leningrad; Leon Izrailevich Feldgun, Ligovsky prospekt, 3/9, kv. 13, Leningrad; Mikhail Andreevich Varzanov, ulitsa Savushkina 1/2, kv. 23, Leningrad; Grigory Osipovich Gomon, ulitsa Dubinovskaya, 49, kv. 28, Leningrad, all of U.S.S.R.

[22] Filed: Oct. 19, 1973

[21] Appl. No.: 408,002

[52] U.S. Cl. .................................. 51/307; 51/309
[51] Int. Cl. .............................................. B24d 3/04
[58] Field of Search ..................... 51/307, 309, 308

[56] References Cited
UNITED STATES PATENTS

| | | | |
|---|---|---|---|
| 3,743,489 | 7/1973 | Wentorf et al. | 51/307 |
| 3,744,982 | 7/1973 | Bovenkerk | 51/307 |
| 3,767,371 | 10/1973 | Wentorf et al. | 51/307 |

*Primary Examiner*—Donald J. Arnold
*Attorney, Agent, or Firm*—Waters, Schwartz & Nissen

[57] ABSTRACT

A superhard composition material is made based on cubic boron nitride. The composite comprises 85–97 wt.% of cubic boron nitride, 1–10 wt.% of a high-melting material and 2–5 wt.% of borides and magnesium and/or calcium oxides.

In the proposed material cubic boron nitride is a dendritic structure of crystallites measuring $10^{-3}$ to $10^{-4}$ cm which interpenetrate while being prepared.

The proposed material is prepared from a mixture, comprising hexagonal boron nitride, a high-melting additive and calcium and/or magnesium borides, by subjecting the mixture to a pressure of 85 to 95 kilobars and a temperature of 2,000° to 2,200°C.

10 Claims, No Drawings

SUPERHARD COMPOSITION MATERIAL BASED ON CUBIC BORON NITRIDE AND A METHOD FOR PREPARING SAME

The present invention relates to improved superhard materials; more particularly it relates to a superhard composite material based on cubic boron nitride and to a method for preparing same. Composites of this kind, known in the art as "compacts," are widely used in the manufacture of cutting, drilling and abrasive tools.

Cubic boron nitride, further referred to as borazon, a superhard material which enjoys wide popularity nowadays, is usually produced in the form of individual crystals not more than 1 mm in size. It is extremely difficult to manufacture cutting or drilling tools based on such diminutive crystals, which is the reason why attempts have been made recently to develop composites based on borazon and high-melting metallic additives. Compacts of this kind are usually produced by sintering borazon powder with high-melting metallic additives.

However, the compacts with their heterogeneous structure are not monolithic and strong enough, which prevents their being utilized in cutting tools.

It is an object of the present invention to provide a superhard composite with improved strength and cutting ability.

It is another object of the present invention to provide a method for producing a high-strength superhard material.

These and other objects are attained by a superhard composite based on borazon with high-melting metallic additives, according to the invention, comprising borazon to the extent of from about 85 to about 97 per cent by weight in the form of a dendritic structure of interpenetrating crystalline grains measuring $10^{-3}$ to $10^{-4}$ cm, as well as magnesium and/or calcium borides and oxides to the extent of from about 2 to about 5 per cent by weight, and high-melting additives to the extent of from about 1 to about 10 per cent by weight.

Such a superhard composite a has an improved compressive strength and an increased cutting ability owing to a more fine-crystalline and homogeneous structure than any known compact, which makes it particularly suitable for machining highly tempered steel and alloys which ordinarily present problems in machining.

The physico-mechanical properties of the proposed superhard composite such, as, for example, heat conductivity and compressive strength may be modified by varying the quantity and phase composition of the high-melting additives.

Silicon carbide, diamond, corundum, boron carbide and borosilicocarbide, taken separately or in combinations, may be used as the additives. The choice of the additives is determined by the particular application of the superhard material. Thus, for example, for working hard-to-machine nonferrous metals and their alloys, a preferred additive would be diamond and/or corundum as well as silicon carbide and/or borosilicocarbide. For hard-to-machine nickel-base alloys, diamond and/or boron carbide may be recommended as the additive.

The proposed superhard composite may be produced, in accordance with the invention, by subjecting a mixture composed of 85 to 97 wt.% hexagonal boron nitride, from about 1 to about 10 wt.% high-melting hard compounds and calcium and/or magnesium borides, to a pressure of from about 85 kilobars to about 95 kilobars and a temperature in the range 2,000° to 2,200°C.

The advantageous feature of the proposed method resides in that a superhard composite may be produced thereby on any commercially available high-pressure apparatus capable of providing the required range of pressures and temperatures.

The invention will now be illustrated by specific examples of production of the proposed superhard composite.

EXAMPLE 1

A homogeneous mixture is prepared to comprise 85 wt.% hexagonal boron nitride, 10 wt.% diamond of powder of grain size 5 to 10µm and 5 wt.% of magnesium diboride. The mixture is briquetted, charged to the reaction space of a lithographic stone container disposed interiorly of a high-pressure chamber, and exposed for 2 min. to a pressure of 85 kilobars and a temperature of 2,000°C.

The resultant superhard composite has a dendritic structure of interpenetrating crystalline grains of borazon measuring $10^{-3}$ to $10^{-4}$ cm and amounting to 84 per cent by weight of the composite. The diamond particles amounting to 10 wt.% and the particles of magnesium borides and oxides amounting in toto to 5 wt.% serve to reinforce the structure of the superhard composite produced, hence ensuring high strength. With the foregoing proportions of the components, the superhard composite has a compressive strength of about 300 kg/mm² and heat conductivity of about 1 w/cm.deg.

EXAMPLE 2

The method of Example 1 is implemented, except that corundum powder of grain size 3 to 1µm is used instead of diamond. The resultant superhard composite comprises some 85 wt.% borazon, about 10 wt.% corundum and 5 wt.% magnesium borides and oxides its compressive strength is about 280 kg/sq.mm.

EXAMPLE 3

The method of Example 1 is implemented, except that silicon carbide powder of grain size 5 to 3µm is employed instead of diamond. The superhard composite obtained comprises about 85 wt.% borazon, about 10 wt.% silicon carbide and 5 wt.% magnesium borides and oxides; its compressive strength is about 270 kg/sq.mm.

EXAMPLE 4

The method of Example 1 is implemented, except that boron carbide powder of grain size 5 to 3µm is employed instead of diamond. The superhard composite obtained is composed of some 85 wt.% borazon, about 10 wt.% boron carbide and 5 wt.% magnesium borides and oxides; its compressive strength is about 220 kg/sq.mm.

EXAMPLE 5

The method of Example 1 is implemented, except that borosilicocarbide powder of grain size 7 to 5µm is employed instead of diamond. The resultant superhard composite is composed of some 85 wt.% borazon, about 10 wt.% borosilicocarbide and 5 wt.% borides and magnesium oxides; its compressive strength is about 240 kg/sq.mm.

EXAMPLE 6

A homogeneous mixture is prepared to comprise 97 wt.% hexagonal boron nitride, 1 wt.% diamond powder of grain size 5 to 3 $\mu$m and 2 wt.% magnesium diboride. The mixture is briquetted, charged to the reaction space of a container made of lithographic stone and disposed interiorly of a high-pressure chamber, and exposed to a pressure of 95 kilobars at a temperature of 2,200°C. for 1 min.

The resultant superhard composite has a dendritic structure of interpenetrating crystalline grains of cubic boron nitride measuring $10^{-3}$ to $10^{-4}$ cm which account for some 97 per cent by weight of the composite. The diamond particles amounting to about 1 wt.% and the particles of magnesium and calcium borides and oxides amounting in toto to 5 wt.% reinforce the structure, thereby ensuring its high strength. With the foregoing percentages of the components, the superhard composite has a compressive strength of 250 kg/sq.mm. and heat conductivity of about 4 w/cm.deg.

EXAMPLE 7

The method of Example 6 is implemented, except that corundum powder of grain size 3 to 1$\mu$m is used instead of diamond. The resultant superhard composite comprises 97 wt.% cubic boron nitride, about 1 wt.% corundum and 2 wt.% magnesium and calcium borides and oxides; its compressive strength is about 230 kg/sq.mm.

EXAMPLE 8

The method of Example 6 is implemented, except that silicon carbide powder of grain size 5 to 3$\mu$m is employed instead of diamond. The resultant superhard composite comprises about 97 wt.% cubic boron nitride, about 1 wt.% silicon carbide and 2 wt.% of magnesium and calcium borides and oxides.

EXAMPLE 9

The method of Example 6 is implemented, except that boron carbide powder of grain size 5 to 3$\mu$m is employed instead of diamond. The resultant superhard composite comprises about 97 wt.% cubic boron nitride, about 1 wt.% boron carbide and 2 wt.% magnesium and calcium borides and oxides.

EXAMPLE 10

The method of Example 6 is implemented, except that borosilicocarbide powder of grain size 7 to 5 $\mu$m is employed instead of diamond. The resultant superhard composite comprises about 97 wt.% cubic boron nitride, about 1 wt.% borosilicocarbide and 2 wt.% magnesium and calcium borides and oxides.

EXAMPLE 11

A homogeneous mixture is prepared to comprise 87 per cent by wight of hexagonal boron nitride, 6 per cent by weight of diamond powder of grain size 5 to 3$\mu$m, 4 per cent by weight of boron carbide of grain size 3 to 1$\mu$m and 3 per cent by weight of magnesium diboride. The mixture is briquetted, charged to the reaction space of a lithographic stone container disposed interiorly of a high-pressure chamber, and exposed for 90 sec. to a pressure of 90 kilobars at a temperature of 2,100°C.

The resultant superhard composite has a dendritic structure of interpenetrating crystalline grains of cubic boron nitride measuring $10^{-3}$ to $10^{-4}$ cm which account for some 87 per cent by weight of the composite. The particles of diamond amounting to about 6 wt.% of the composite, as well as the particles of boron carbide amounting to about 4 wt.% and of magnesium and calcium borides and oxides amounting in toto to about 3 wt.% reinforce the structure of the composite lending it high strength and cutting ability. With the foregoing percentages of the components, the superhard composite has a compressive strength of about 270 kg/sq.mm. and heat conductivity of about 7 w/cm.deg.

EXAMPLE 12

The method of Example 11 is implemented, except that corundum powder of grain size 3 to 1$\mu$m to the extent of 7 wt.% and diamond powder of grain size 5 to 3$\mu$m to the extent of 3 wt.% are employed instead of diamond and boron carbide. The resultant composite comprises some 87 wt.% cubic boron nitride, 7 wt.% corundum, 3 wt.% diamond and 3 wt.% magnesium and calcium borides and oxides; its ultimate compressive strength is about 250 kg/sq.mm.

EXAMPLE 13

The method of Example 11 is implemented, except that silicon carbide of grain size 10 to 7$\mu$m to the extent of 5 wt.% and borosilicocarbide powder of grain size 7 to 5$\mu$m to the extent of 5 wt.% are employed instead of diamond and boron carbide. The resultant composite comprises 87 wt.% cubic boron nitride, 5 wt.% silicon carbide, 5 wt.% borosilicocarbide and 3 wt.% magnesium and calcium borides and oxides; its compressive strength is about 230 kg/sq.mm.

In all the foregoing Examples the products are billets for the manufacture of tools, the size of the billets depending only on the dimensions of the high-pressure chamber and the cutting capability of the billet being the same about any cross-section. This feature makes the proposed superhard composite suitable for the manufacture of cutting, drilling and boring tools as well as dies.

What we claim is:

1. A superhard composite, comprising from about 85 to about 97 per cent by weight of cubic boron nitride in the form of a dendritic structure of interpenetrating crystalline grains measuring from $10^{-3}$ to $10^{-4}$ cm, from about 1 to about 10 per cent by weight of high-melting materials selected from the group consisting of silicon carbide, diamond, corundum, boron carbide, borosilico-carbide and mixtures thereof and from about 2 to about 5 per cent by weight of a substance selected from the group consisting of magnesium and calcium borides and oxides and mixtures thereof.

2. A superhard material according to claim 1, wherein silicon carbide serves as the high-melting component.

3. A superhard composite according to claim 1, wherein diamond serves as the high-melting component.

4. A superhard composite according to claim 1, wherein corundum serves as the high-melting component.

5. A superhard composite according to claim 1, wherein boron carbide serves as the high-melting component.

6. A superhard composite according to claim 1, wherein borosilicocarbide serves as the high-melting component.

7. A superhard composite according to claim 1, wherein diamond and corundum serve as the high-melting component.

8. A superhard composite according to claim 1, wherein silicon carbide and borosilicocarbide serves as the high-melting component.

9. A superhard composite according to claim 1, wherein diamond and boron carbide serve as the high-melting component.

10. A method for producing a superhard composite under high pressure and temperature, whereby a mixture, comprising from 85 to 97 per cent by weight of hexagonal boron nitride, from 1 to 10 per cent by weight of solid high-melting compounds selected from the group consisting of silicon carbide, diamond, corundum, boron carbide, borosilico-carbide and mixtures thereof and from about 2 to about 5 per cent by weight of a substance selected from the group consisting of magnesium and calcium borides and oxides and mixture thereof, is exposed to a pressure of from about 85 to 95 kilobars and a temperature in the range 2,000° to 2,200°C.

* * * * *